United States Patent [19]

Child et al.

[11] 3,928,000

[45] Dec. 23, 1975

[54] PRODUCTION OF A CLEAN METHANE-RICH FUEL GAS FROM HIGH-SULFUR CONTAINING HYDROCARBONACEOUS MATERIALS

[75] Inventors: Edward T. Child, Tarrytown, N.Y.; Allen M. Robin, Anaheim, Calif.; William L. Slater, La Habra, Calif.; George N. Richter, San Marino, Calif.

[73] Assignee: Texaco Inc., New York, N.Y.

[22] Filed: Dec. 28, 1973

[21] Appl. No.: 429,470

[52] U.S. Cl............... 48/197 R; 48/215; 252/373; 252/411 R; 252/465; 260/449 M
[51] Int. Cl.².......................................... C10J 3/06
[58] Field of Search........... 48/215, 197 R; 252/373, 252/410, 411 R, 465; 260/449 M

[56] References Cited
UNITED STATES PATENTS

| | | | |
|---|---|---|---|
| 3,444,099 | 5/1969 | Taylor et al.............. | 48/197 R |
| 3,709,669 | 1/1973 | Marion et al............. | 48/215 |
| 3,740,204 | 6/1973 | Slater et al.............. | 48/215 |
| 3,759,679 | 9/1973 | Franz et al............... | 260/449 M |
| 3,816,332 | 6/1974 | Marion..................... | 48/215 |

FOREIGN PATENTS OR APPLICATIONS

| | | | |
|---|---|---|---|
| 165,746 | 10/1955 | Australia................. | 260/449 M |

OTHER PUBLICATIONS

R. Norris Shreve: Chemical Process Industries, 3rd edition, McGraw–Hill, 1960, p. 744.

Primary Examiner—S. Leon Bashore
Assistant Examiner—George C. Yeung
Attorney, Agent, or Firm—T. H. Whaley; C. G. Ries; Albert Brent

[57] ABSTRACT

This is an improved process for converting low-cost high-sulfur containing hydrocarbonaceous materials into a clean methane-rich gas stream which may be burned as a fuel without contaminating the atmosphere. A high-sulfur hydrocarbonaceous fuel is gasified by partial oxidation to produce a process gas stream which is cooled, cleaned and subjected to catalytic methanation over a sulfur-resistant catalyst comprising 0.8 to 10 atoms of an element selected from the group comprising Co, Cr, W or mixtures thereof per atom of an element selected from the group Mo, Ni, or mixtures thereof. The catalyst may be supported on a structure formed from Group III and IV elements e.g. alumina, silica stabilized alumina, zeolite. A distinct advantage of the subject process, is that the sulfur in the process gas stream is not removed prior to the methanation step. Rather, the sulfur is permitted to remain in the process gas stream in order to moderate the highly exothermic methanation reaction. After cooling and purification by removing one or more members of the group $H_2$, CO, $H_2O$, $CO_2$, COS, $H_2S$, Ar, and $N_2$, the resulting methane-rich gas stream comprises about 10 to 95 mole % $CH_4$. Optionally, the $CH_4$ content of said methane-rich gas stream may be increased to about 98 mole % or more by the additional steps of water-gas shift conversion, catalytic methanation, cooling, drying and $CO_2$ removal. The product gas would then have a gross heating value of about 1000 BTU/SCF.

23 Claims, No Drawings

PRODUCTION OF A CLEAN METHANE-RICH FUEL GAS FROM HIGH-SULFUR CONTAINING HYDROCARBONACEOUS MATERIALS

BACKGROUND OF THE INVENTION

1. Field of the Invention

This invention relates to a continuous process for the production of a clean methane-rich gas stream from a high-sulfur containing fuel. More specifically, the present invention relates to the production of clean gaseous heating fuels from low cost high-sulfur containing hydrocarbonaceous materials. Further, the product gas may be burned without polluting the environment.

2. Description of the Prior Art

A national dilemma exists as the result of a diminishing supply of natural gas and an increasing demand for it. The impact of the gas crisis is being felt nationwide in rising prices, in governmental regulations with respect to the consumption of natural gas, and in prohibitions against the use of national gas in future commercial, industrial and apartment-house construction. It is imperative that alternate sources of low-cost gaseous heating fuels be developed which will not pollute the atmosphere when burned.

In coassigned U.S. Pat. No. 3,688,438, synthesis gas was made having up to 26 volume percent of methane by the partial oxidation of a hydrocarbonaceous fuel using comparatively high steam to fuel weight ratios and no subsequent catalytic methanation step. In coassigned U.S. Pat. No. 3,709,669, the synthesis gas leaving the partial oxidation gas generator is subjected to an additional step involving the water-gas shift reaction to adjust the $H_2/CO$ mole ratio to preferably 3 before catalytic methanation.

In prior art catalytic methanation processes it was necessary to keep the sulfur content of the process gas stream below 0.1 parts per million (p.p.m) so as not to poison the methanation catalyst. When hydrocarbonaceous materials containing more than about 500 ppm of sulfur are used as fuels they require expensive processing to remove sulfur. In order to increase the life of conventional methanation catalyst in prior art processes, it is necessary to reduce the $H_2S$ and COS content of the process gas stream prior its introduction into the methanation zone. In contrast, by means of the subject invention, sulfur remains in the process gas stream and goes into the catalytic methanation zone.

SUMMARY

This is a process for producing a methane-rich gas comprising $CH_4$ in the range of 10–95 mole % (dry basis) or optionally 98 mole % $CH_4$, or more from a sulfur-containing hydrocarbonaceous fuel such as from high-sulfur petroleum materials and coal. The process steps comprise: reacting the sulfur-containing hydrocarbonaceous fuel feed by partial oxidation with substantially pure oxygen and a temperature moderator at an autogeous temperature in the range of about 1700° to 3100°F., and a pressure in the range of about 1 to 250 atmospheres in the reaction zone of a free-flow unpacked noncatalytic synthesis gas generator to product a stream of effluent gas comprising: $H_2$, CO, $CO_2$, $H_2O$, and one or more members of the group $CH_4$, $H_2S$, COS, $N_2$ and Ar, and particulate carbon; cooling the process gas stream to a temperature in the range of about 300 to 800°F., by indirect heat exchange with water thereby producing steam; separating particulate carbon and $H_2O$ from the process gas stream; introducing the process gas stream into a methanation zone containing a sulfur-resistant methanation catalyst comprising about 0.8 to 10 atoms of a first element selected from the group Mo, Cr, W or mixtures thereof per atom of a second element selected from the group Co, Ni or mixtures thereof, and reacting said $H_2$ and CO together at a temperature in the range of about 500° to 1500°F., and at a pressure in the range of about 1 to 250 atmospheres to produce a methane-rich gas stream comprising mixtures of $CH_4$ and one or more members of the group $H_2$, CO, $H_2O$, $CO_2$, COS, $H_2S$, Ar, and $N_2$; and cooling the methane-rich gas stream and removing one or more members of said group therefrom to produce a gaseous stream comprising 10 to 95 mole % (dry basis) of $CH_4$.

Optionally, the $CH_4$ content of said methane-rich gas stream may be increased to about 98 mole % or more by the additional steps of water-gas shift conversion, catalytic methanation, cooling, drying, and $CO_2$ removal.

DESCRIPTION OF THE INVENTION

By means of the subject process, a methane-rich product gas stream containing methane in the range of about 10 to 95 mole % (dry basis) and even up to 98 mole % or more is produced from high-sulfur fuels. The product gas has a heating value in the range of about 350 to 1000 BTU per SCF, or more. Further, it is substantially free from sulfur compounds and may be burned without polluting the atmospheres.

In the first step of the process synthesis gas comprising principally hydrogen, carbon monoxide, carbon dioxide, water vapor, and one or more members of the group methane, nitrogen, argon, carbonyl sulfide, and hydrogen sulfide, as well as entrained particulate carbon is produced by the reaction of a hydrocarbonaceous fuel by partial oxidation with substantially pure oxygen and a temperature moderator e.g. $H_2O$, $CO_2$, and mixtures thereof in the reaction zone of a free-flow synthesis gas generator free from packing or catalyst. The composition of the charge and the conditions of the reaction are controlled so as to produce an effluent gas stream containing a mole ratio $H_2/CO$ in the range of about 1.5 to 2.5, from about 0 to 20 mole % $CH_4$ and from about 0.1 to 13 weight percent of entrained particulate carbon (basis weight of carbon in the hdyrocarbonaceous fuel).

Hydrocarbonaceous fuels with a sulfur content in the range of about 1 to 7 wt. % that are suitable feedstocks to the gas generator include by definition various petroleum distillate and residua, naphtha, gas oil, residual fuel, reduced crude, whole crude, asphalt, coal tar, coal oil, shale oil, and tar sand oil. Light petroleum distillates having an initial atmospheric boiling point (i.b.p.-ASTM D86) up to 400°F e.g. naphtha, gasoline, kerosine may be used. However, an economic advantage is obtained when low cost sulfur containing petroleum fuels having an i.b.p. in the range of 400° to 900°F. are used. Included also are pumpable slurries of solid hydrocarbonaceous fuels e.g. coal, particulate carbon, and petroleum coke in a liquid hydrocarbon fuel such as one previously listed, or in water.

The temperature moderator introduced into the gas generator may be $H_2O$, $CO_2$, or mixtures thereof. The $CO_2$ may be an off-gas stream produced subsequently in the process in the gas purification zone. This stream may comprise a stream of about 95 mole % $CO_2$ or mixtures of $CO_2$ and $H_2S$.

When $H_2O$ is the temperature moderator, it may be supplied to the generator in liquid or gaseous phase. It may be introduced either separately or in admixture with the free-oxygen containing gas or with the hydrocarbonaceous feedstock, or both. Water will moderate the temperature of the reaction zone and may also react with CO and the hydrocarbon fuel in the reaction zone. About 0.2 to 5.0 lbs. of $H_2O$ are introduced into the reaction zone per lb. of hydrocarbonaceous fuel.

Substantially pure oxygen is introduced into the reaction zone of the synthesis gas generator simultaneously with the $H_2O$ and hydrocarbonaceous fuel. Suitably, an annulus-type burner, such as described in coassigned U.S. Pat. No. 2,928,460 issued to du Bois Eastman et al., or in coassigned U.S. Pat. No. 3,743,606 issued to C. P. Marion et al., may be employed. The substantially pure oxygen may be introduced at a temperature in the range of about ambient to 1000°F. The substantially pure oxygen comprises (95 mole % $O_2$ or more) and preferably 98 mole % $O_2$ or more. Substantially pure oxygen is required so as to avoid significant amounts of nitrogen and argon in the effluent gas. The amount of oxygen supplied is controlled so as to prevent complete oxidation of the hydrocarbonaceous feed and to control the temperature in the reaction zone. About 0.85 to 1.00 atoms of oxygen in the substantially pure oxygen is introduced into the reaction zone per atom of carbon in the hydrocarbonaceous fuel.

The reaction zone is preferably a conventional Texaco Synthesis Gas Generator. The synthesis-gas generator is free from any obstruction to the flow of the gases therethrough. It is a cylindrically shaped vertical steel pressure vessel whose inside walls are lined with refractory. An axially aligned flanged inlet port is located at the bottom. The various feedstreams may be introduced into the gas generator at ambient temperature, but preferably they are introduced it a temperature in the range of about 100° to 1000°F. Preferably, an annulus-type burner which is axially mounted in the top flanged port of the generator may be used for introducing and mixing the feedstreams.

Suitable gas generators are disclosed in coassigned U.S. Pat. Nos. 2,818,326 and 3,000,711 to du Bois Eastman et al. The size of the reaction chamber is selected so that the average residence time of the reactants and resulting reaction products within the reactor is within the range of 0.5 to 20 seconds, and preferably 1 to 8 seconds.

In the reaction zone of the free-flow noncatalytic synthesis gas generator, reaction takes place at an autogenous temperature in the range of about 1700° to 3100°F. and preferably in the range of about 2000° to 2800°F., and at a pressure in the range of about 1 to 250 atmospheres, and preferably in the range of about 20 to 200 atmospheres.

The effluent gas stream from the gas generator has the following composition in mole %: $H_2$ 20 to 60; CO 10 to 50; $H_2O$ 5 to 20; $CO_2$ 2 to 50; $CH_4$ 0.0 to 20; $H_2S$ nil to 2.0; COS nil to 0.1; $N_2$ nil to 0.3; Ar nil to 0.3; and from 0.1 to 13 wt. % of particulate carbon (basis C in hydrocarbonaceous fuel). Preferably the mole ratio $H_2/CO$ is in the range of about 1.0 to 2.5.

By conventional means, the effluent gas stream from the generator is cooled, and the particulate carbon and gaseous impurities are removed. For example, the effluent gas stream may be passed through an in-line waste-heat boiler and cooled to a temperature in the range of about 300° to 800°F. by indirect heat exchange with water, thereby producing steam. The steam may be used elsewhere in the process, such as in the gas generator. Alternately, the effluent gas stream from the gas generator may be quenched in water in a quench tank such as shown in coassigned U.S. Pat. No. 2,896,927. Advantageously, by this means a large portion of the particulate carbon and other solids entrained in the effluent gas stream is removed by the quench water. A suitable arrangement utilizing a waste-heat boiler is shown in coassigned U.S. Pat. No. 3,709,669.

Further, particulate carbon and any other entrained solids may be removed from the effluent gas stream by well known scrubbing techniques in a gas-liquid scrubbing zone. For example, the particulate carbon may be removed by scrubbing the process gas with a scrubbing fluid comprising oil, water, or both. The slurry of particulate carbon and scrubbing fluid may be recycled to the gas generator as a portion of the hydrocarbonaceous feedstock.

When oil is used as the scrubbing fluid, preferably the temperature of the scrubbing oil is kept below its cracking temperature and above the dewpoint of $H_2O$ in the process gas stream. In one embodiment of our process, the process gas stream is introduced into a liquid-gas tray-type column, such as more fully described in Perry's Chemical Engineers' Handbook, Fourth Edition, McGraw Hill 1963, Pages 18–3 to 5 in countercurrent flow with a liquid hydrocarbon fuel oil. A slurry of particulate carbon and liquid hydrocarbon fuel oil is removed from the bottom of the scrubbing column at a suitable preheat temperature for introducing into the reaction zone of the synthesis gas generator as a portion of the hydrocarbonaceous feedstock.

When required, additional scrubbing may be provided to supplement the aforesaid gas scrubbing. For example, the gas stream may be quenched in hydrocarbon oil or washed with a liquid hydrocarbon fuel by means of a scrubbing nozzle or venturi scrubber, such as described in Perry's Chemical Engineers' Handbook Fourth Edition, McGraw Hill 1963, Pages 18–54 to 56. The process gas stream leaving the top of the scrubbing tower is substantially free from particulate carbon and is at a temperature in the range of about 300–650°F. This stream is then cooled below the dew point to condense out and separate any volatilized hydrocarbons and water found therein. For additional information on suitable gas scrubbing, reference is made to coassigned U.S. Pat. No. 3,639,261.

While the subject sulfur resistant catalyst was developed principally for the methanation of streams of synthesis gas comprisinng $H_2$ and CO as produced in a partial oxidation noncatalytic synthesis gas generator, the subject catalyst may also be used for the methanation of synthesis gas of similar composition but which has been produced by other processes e.g. steam reforming of hydrocarbons etc. when the synthesis gas feed contains little or no particulate carbon, the gas-cleaning step may be eliminated. Similarly, when the stream of synthesis gas being introduced into the methanation zone is already dry and at the proper temperature the step of cooling below the dew point to condense out water may be omitted.

The clean dry process gas stream is introduced into a methanation zone comprising one or more fixed beds of sulfur-resistant methanation catalyst to be further described. Alternately, a fluidized bed of sulfur-resistant methanation catalyst may be employed.

The catalytic production of methane from hydrogen and carbon oxides is ordinarily highly exothermic. By maintaining the concentration of sulfur in the process gas stream in the range of about 200 to 20,000 ppm, the activity of the catalyst is controlled and runaway reactions are prevented. Excessive catalyst-bed temperatures that can destroy the activity of the catalyst and reduce methane yields may be effected further by any of the following techniques: distribution of the feed-gas stream throughout fixed bed reactors by means of separate inlet points, embedding tubular coolers in the catalyst beds and producing steam which may be used elsewhere in the process, cooling the effluent gas between beds with simultaneous steam generation, use of beds of fluidized catalyst or by using a free flow tubular reactor whose inside surfaces are coated with catalyst.

Another method of controlling catalyst-bed temperatures while increasing the concentration of methane in the product gas consists of recycling a portion of the product gases through the catalyst bed in admixture with fresh feed gas at ratios ranging from 0.5 to 50 volumes of recycle gas per volume of fresh feed gas and preferably at recycle ratios in the range of 1 to 5.

The sulfur-resistant catalyst as first used herein in the production of methane from carbon oxides and hydrogen comprises 0.8 to 10 atoms of an element selected from the group consisting of Mo, Cr, W and equal mixtures thereof per atom of an element selected from the group consisting of Co, Ni, and equal mixtures thereof. The catalyst may be supported on a structure formed from Groups III and IV elements e.g. alumina, silica stabilized alumina, rare earth metal ions exchanged zeolite, and diatomaceous earth.

A preferred sulfur-resistant catalyst consists of $MoO_3$ and CoO wherein from about 0.8 to 10 atoms of Mo are present per atom of Co. Suitably, the atomic ratio Mo/Co is in the range of 1.5–4 and specifically about 2.5. Suitably, the atomic ratio W/Co or W/Ni is in the range of about 0.9–2, and specifically 1.0.

Advantageously, in fixed bed methanators the aforesaid sulfur resistant catalyst may be supported. In such case from about 5 to 60 weight % constitutes the aforesaid elements and the remainder constitutes the substrate. Alumina, silica, aluminol-silicates or mixtures thereof may be used as the substrate. A suitable carrier is activated alumina gel containing about 5% of silica. The silica serves to stabilize a catalyst and to prolong its life.

The subject sulfur-resistant catalyst containing cobalt and molybdenum may be prepared by any suitable conventional process, as for example U.S. Pat. No. 2,687,381. Preferred commercially available cobalt-molybdenum on alumina base catalysts are available from American Cyanamid Co. under the trade mark Aero HDS-2, 6, and 6A. The chemical analysis of these materials in wt. % is CoO 3.0 to 4.0, $MoO_3$ 9.5 to 16.0 and the remainder alumina base having a high surface area in excess of 100 $m^2$/G. Typical physical properties are apparent bulk density (poured) lb./ft. 31–36; average diam. in 0.10–0.15 and 0.050–0.075; crush strength min. lb. 12; surface area, $m^2$/g 200–275; and pore volume cc/g 0.5 to 0.6. American Cyanamid's Aero HDS-3 and 3A have similar properties but equal amounts of nickel oxide (NiO) replace the CoO and the apparent bulk density is 38–43 lb/ft.

The operating conditions in a fixed bed sulfur-resistant catalytic methanator are entrance temperature in the range of about 500° to 1000°F., exit temperature in the range of about 500° to 1500°F. such as 500° to 800°F; and preferably in the range of about 700° to 1300°F., pressure in the range of about 1 to 250 atmospheres and preferably equal to the pressure in the gas generator less ordinary line drop, and a space velocity in the range of about 80 to 10,000 standard volumes of gas per volume of catalyst per hour (v/v/hr).

In comparison with conventional low temperature methanation catalysts, one advantage of operating with the subject methanation catalyst at a temperature over 1000°F. is that the sulfur tolerance and activity of the subject sulfur-resistant catalyst increase at the higher temperatures. This may be off-set somewhat by a reduction of CO conversion at higher temperatures.

Alternately, in a fluidized bed methanator the sulfur resistant catalyst has a preferred particle size of 20 to 1000 microns. Operating conditions include temperature in the range of about 600° to 1500°F. and preferably 700° to 1300°F., pressure 1 to 50 atmospheres, and contact time 0.5 to 10 seconds.

The effluent gas stream from the sulfur-resistant catalytic methanator has the following analysis in mole %: $CH_4$ 5 to 85; CO nil to 45; $H_2$ nil to 50; $CO_2$ nil to 50; $H_2O$ nil to 50; $H_2S$ nil to 2; COS nil to 0.1; and Ar+$N_2$ nil to 0.6.

Next the effluent gas stream from the sulfur-resistant catalytic methanator is cooled for example in a waste heat boiler. By this means water is converted into steam, and the temperature of the gas stream is reduced to 250° to 600°F. The steam may be used elsewhere in the system or exported.

In the next step in the process, $CO_2$, $H_2O$, $H_2S$, COS and Ar+$N_2$ are removed from the process gas stream in a gas purification zone. This may be done by suitable conventional processing involving cooling and physical or chemical absorption with solvents, such as methyl alcohol, n-methyl pyrrolidone, triethanolamine, propylene carbonate, and potassium carbonate. Methane should be substantially insoluble in the solvent selected. Most of the $CO_2$ absorbed in the solvent can be released by simple flashing. The stream of $CO_2$ has a purity of more than 98.5 percent and may therefore be used for organic synthesis. Optionally, the $CO_2$ stream may be introduced into the gas generator as at least a portion of the temperature moderator. The regenerated solvent is then recycled to the absorption column for reuse. When necessary final cleanup may be accomplished by passing the process gas through iron oxide, zinc oxide, or activated carbon to remove residual traces of $H_2S$ or organic sulfide.

$H_2S$ and COS-containing solvent is regenerated by further flashing. The $H_2S$ and COS may be then converted into sulfur by a desirable process. For example, the Claus process may be used to produce elemental sulfur from $H_2S$, as described in Kirk-Othmer Encyclopedia of Chemical Technology, Second Edition Vol. 19, John Wiley, 1969 Page 352.

The substantially dry gaseous mixture from the gas purification zone has the following composition in mole percent: $H_2$ 0 to 50, CO 0 to 50, $CH_4$ 10 to 95, $CO_2$ 0 to less than 1, Ar+$N_2$ 0 to 0.4, and 0 to less than about 0.3 parts per million of total sulfur i.e. $H_2S$ + COS. Its gross heating value is in the range of about 350 to 950 BTU per SCF. This gas may be used as a fuel gas.

Optionally, to prepare substantially pure methane e.g. 98 mole % $CH_4$ or more, and thereby produce a synthetic natural gas having a gross heating value of about 1000 BTU/SCF, the effluent gas stream from the gas purification zone is subjected to the following additional steps. Sufficient $H_2O$ is added to the process gas stream so that when all of the $H_2O$ in the process gas stream reacts with a portion of CO in the process gas stream by conventional catalytic water-gas shift reaction, the $H_2/(CO+CO_2)$ mole ratio in the process gas stream leaving the water-gas shift converter is in the range of about 1 to 4, thus after addition of supplemental $H_2O$ the mole ratio $CO/H_2O$ in the process gas stream being introduced into the water-gas shift converter is preferably in the range of about 0.3 to 1.0. Also the effluent gas stream from the water-gas shift converter would contain stoichiometric quantities of $H_2$ to react with all of the CO and $CO_2$ remaining in said gas stream to produce $CH_4$ and $CO_2$ in a downstream catalytic methanator.

The conventional low temperature water-gas shift reaction takes place at a temperature in the range of about 350° to 650°F., and a pressure in the range of about 1 to 250 atmosphere and preferably equal to the pressure in the gas generator less ordinary pressure drop in the lines. The water-gas shift catalyst may comprise mixtures of copper and zinc salts or oxides in weight ratio of about three parts zinc to one part copper salts or oxides in weight ratio of about three parts zinc to one part copper.

At a temperature in the range of about 350° to 700°F., the effluent gas stream from the water-gas shift converter is introduced into a comparatively low temperature catalytic methanator where substantially all of the $H_2$ and CO and a portion of the $CO_2$ are converted into $CH_4$. Since the sulfur content of the process gas stream has been previously reduced in the gas purification zone from 0 to 0.1 ppm, a conventional methanation catalyst may be employed in the second methanator.

The Group VIII transition elements, mainly iron, nickel, and cobalt, appear to be the most suitable for use as methanation catalysts in the second methanator. Typical commercial preparations contain about 33 to 78 weight percent of nickel oxide and about 12 to 25 percent of aluminum oxide and are used in the form of ⅜ inch × ⅜ inch or ¼ inch × ¼ inch cylindrical tablets. A typical nickel oxide catalyst is Girdler G65 produced by Chemetron Corp. Suitable catalyst compositions include the following: $NiO-Al_2O_3$ or NiO-MgO precipitated on kaolin and reduced with hydrogen; and also in parts by weight Ni 100, $ThO_2$ 6, MgO 12, and Kieselguhr (diatomaceous earth) 400 reduced with hydrogen for 2 hours at 752°F. The life of the catalyst may be extended by maintaining the sulfur level in the reactant gases below about 0.005 grains of sulfur per thousand standard cubic feet. The operating temperature in the methanator is in the range of about 390° to 1000°F. For example, the preferable exit temperature for the aforesaid $NiO-Al_2O_3$ catalyst is about 662°F. Space velocities range from 100 to 10,000 standard volumes of gas per volume of catalyst ($hr^{-1}$) and pressures range from 1 to 250 atmospheres. Preferably, the pressure in the methanator is substantially the same as that in the gas generator less any ordinary drop in the line.

The process gas stream leaves the second methanator at a temperature in the range of about 390° to 1000°F., and is passed into a $CO_2$ removal zone. For example, a separate passage may be provided in the $CO_2$ removal section of the gas purification zone previously described. If required, cryogenic refrigeration may be used to separate the methane from nitrogen and argon which may be present in the amount of about 0.1 to 0.3 volume percent. The product gas after final purification has a gross heating value in the range of 800 to 1000 BTU/SCF and comprises in mole %: $CH_4$ 70 to 99; CO nil to 15; $H_2$ 0 to 15; and $N_2+Ar$ 0 to 0.4.

By the subject invention, a clean fuel gas may be produced which may be burned without polluting the atmosphere. This process has the following significant advantages over other schemes for making fuel gas:

1. The initial methanation, and thus the most difficult one to control, may be undertaken in the syngas generator under conditions which preclude the danger of runaway reactions.

2. The gases do not have to be cooled down before methanation to remove the $H_2S$.

3. The high energy release is at a very high temperature so that it can be recovered with a higher thermal efficiency. Thus, by-product steam may be produced at higher temperatures.

4. A maximum yield of desirable products i.e. $H_2+CO+CH_4$ are obtained at substantially the same generator pressure less ordinary drop in the line.

5. The sulfur-resistant catalytic methanator is preferably operated continuously at temperatures above 1000°F. thereby improving the sulfur tolerance of the catalyst and increasing its activity.

6. The product gas may be used interchangeably with natural gas and may be transported in the same pipeline.

7. The product gas may be produced at substantially the same pressure as in the gas generator e.g. 1 to 250 atmospheres. Costly gas compressors are thereby eliminated.

EXAMPLES

The following examples are offered as a better understanding of the present invention but the invention is not to be construed as unnecessarily limited thereto.

EXAMPLE I

On an hourly basis about 202 pounds of California vacuum residuum feedstock at a temperature of 287°F. are introduced into a free-flow non-catalytic synthesis gas generator by way of an annulus-type burner. The oil feedstock has an API gravity of 7.5, a viscosity of 700 Saybolt seconds Furol 122°F., and a heat of combustion of 18027 BTU (Brutish Thermal Units) per pound. The oil feedstock has the following ultimate analysis in weight %: C 85.9, H 10.4, O 0.0, N 1.1, S 2.6, and ash 0.05.

Simultaneously, 419 pounds of $H_2O$ at a temperature of 650°F., and 2213 SCFH (Standard Cubic Feet per Hour) of substantially pure oxygen (95 mole % $O_2$ or more) at a temperature of 75°F. are charged into the gas generator. The weight ratio $H_2O$/fuel is 2.07 and the atomic ratio of $O_2$ in the substantially pure oxygen to carbon in the fuel is 0.805.

Reaction takes place between the feedstreams in the reaction zone of the gas generator at a pressure of about 100 atmospheres and at an autogenous temperature of 1950°F. The average residence time in the 2.1 cubic reaction zone is about 11 seconds. By the partial oxidation reaction, the hydrocarbonaceous feedstream is converted into 8191 SCFH of an effluent gas stream having the following dry gas composition in mole percent: CO 22.3, $H_2$ 39.3, $CO_2$ 23.3, $CH_4$ 14.5, $N_2$+Ar 0.12, $H_2S$ 0.40, and COS 0.0. 11.3 lbs. per hr. of particulate carbon is entrained in the effluent gas stream from the gas generator.

The process gas stream leaving the gas generator is cooled to a temperature of 600°F. by indirect heat exchange with water in a waste heat boiler. Simultaneously, steam for recycle to the gas generator is produced in the waste heat boiler. In a manner previously described, the particulate carbon is scrubbed from the process gas stream, and water is removed.

At a space velocity of 1000 standard volumes of gas per volume of catalyst per hour (v/v/hr) and at a temperature of about 600°F. and a pressure of about 98 atmospheres, the aforesaid stream of dry synthesis gas is introduced into a catalytic methanation reactor. The sulfur-resistant methanation catalyst comprises in parts by weight CoO 3.2, $MoO_3$ 15.7, and $Al_2O_3$ 81.1. The catalytic methanation zone consists of 2 fixed beds of sulfur-resistant methanation catalyst in series with interbed cooling. $H_2$ and CO are reacted together in the methanation zone. The methane-rich gas stream leaving the methanator at a temperature of 800°F., has the following composition in mole %: CO 1.73, $H_2$ 2.07, $CO_2$ 42.07, $H_2O$ 11.89, $CH_4$ 41.48, $H_2S$ 0.57, COS 0.00, $N_2$+Ar 0.17.

The effluent gas stream from the sulfur-resistant catalytic methanation zone is passed through a waste heat boiler and cooled to a temperature of about 400°F. by converting water into steam.

In a gas purification zone, by methods previously described, $CO_2$, $H_2S$, COS, and $H_2O$ are removed from the process gas stream to produce a stream of 2625 standard cubic feet per hour of methane-rich gas having a gross heating value of 948 BTU/SCF and the following composition in mole %: $CH_4$ 91.27, CO 3.80, $H_2$ 4.56 and $N_2$+Ar 0.37.

EXAMPLE II

This embodiment of the invention describes the additional steps required to produce a stream of substantially pure methane or synthetic natural gas having a gross-heating value of about 1000 BTU/SCF.

On an hourly basis 2625 SCF of the methane-rich gas produced in Example I are mixed with 300 SCF of steam. At a temperature of about 400°C. and a pressure of about 96 atmospheres the gaseous mixture is introduced into a fixed bed conventional catalytic water-gas shift conversion zone. The low-temperature water-gas shift catalyst comprises a mixture of copper and zinc oxides in a weight ratio of a about 3 parts zinc to 1 part copper. The effluent gas stream from the water-gas shift conversion zone has an exit temperature of about 450°F. and the following composition in mole %: $CH_4$ 81.91, CO 1.88, $H_2$ 5.63, $CO_2$ 1.53, $N_2$+Ar 0.33 and $H_2O$ 8.72.

After removal of the $H_2O$ and $CO_2$ the process gas stream is introduced into a conventional adiabatic catalytic methanation zone at a temperature of about 500°F and a pressure of about 95 atmospheres. The space velocity is about 3000 v/v/hr. The methanation catalyst comprises in parts by weight Ni 100, ThO 6, MgO 12 and Kiesslguhr 400. Substantially all of the CO in the process gas stream is reacted in the methanator to produce $CH_4$ and $H_2O$.

The effluent gas stream from the second catalytic methanator has an exit temperature of about 620°F. and the following composition in mole %: $CH_4$ 98,04, $H_2$ 1.25, $CO_2$ 0.31 and $N_2$+Ar 0.39. The $CO_2$ is removed from this gas stream by conventional processing as described previously. A product stream is produced having a gross heating value of 997.1 BTU/SCF and the following composition in mole %: $CH_4$ 98.36, $H_2$ 1.25, CO 0.0, and $N_2$+Ar 0.39.

Obviously many modifications and variations of the invention as hereinbefore set forth may be made without departing from the spirit and scope thereof, and only such limitations should be imposed as are indicated in the appended claims.

We claim:
1. A process for producing a methane-rich gas from a sulfur-containing hydrocarbonaceous fuel comprising the steps of
   1. reacting said sulfur-containing hydrocarbonaceous fuel feed by partial oxidation with substantially pure oxygen comprising 95 mole % $O_2$ or more and a temperature moderator from the group $H_2O$, $CO_2$, and mixtures thereof at an autogenous temperature in the range of about 1700° to 3100°F and a pressure in the range of about 1 to 250 atmospheres in the reaction zone of a free-flow unpacked noncatalytic synthesis gas generator, wherein the mole ratio of oxygen in the free-oxygen containing gas to carbon in the hydrocarbonaceous fuel is in the range of about 0.80 to 1.0, and the stream of effluent gas leaving the synthesis gas generator comprises mixtures of $H_2$, CO, $H_2O$, $CO_2$, and one or more members of the group $CH_4$, $H_2S$, COS, $N_2$, and Ar, and particulate carbon;
   2. cooling the process gas stream from (1) to a temperature in the range of about 300° to 800°F by indirect heat exchange with water thereby producing steam;
   3. separating particulate carbon and $H_2O$ from the process gas stream from (2);
   4. introducing the process gas stream from (3) without purification of said gas stream directly into a methanation zone containing a sulfur-resistant methanation catalyst comprising about 0.8 to 10 atoms of a first element selected from the group Mo, Cr, W or mixtures thereof per atom of a second element selected from the group CO, Ni or mixtures thereof, and reacting said $H_2$ and CO together at a temperature in the range of about 500 to 1500°F and at a pressure in the range of about 1 to 250 atmospheres to produce an effluent gas stream comprising mixtures of $CH_4$ and one or more members of the group $H_2$, CO, $H_2O$, $CO_2$, COS, $H_2S$, $N_2$ and Ar; and
   5. cooling the effluent gas stream from (4) and removing therefrom one or more members of said group in a gas purification zone.

2. The process of claim 1 wherein said sulfur-containing hydrocarbonaceous fuel contains from about 1 to 7 wt. % sulfur and is selected from the group consisting of liquid hydrocarbon fuel, and slurries of coal and petroleum coke in liquid hydrocarbon fuel or water.

3. The process of claim 1 wherein said sulfur-resistant methanation catalyst in step (4) comprises about 1.5 to 4 atoms of Mo per atom of Co.

4. The process of claim 3 wherein said sulfur-resistant methanation catalyst comprises about 2.5 atoms of Mo per atom of Co.

5. The process of claim 1 wherein the sulfur-resistant methanation catalyst in step (4) comprises cobaltmolybdate-alumina.

6. The process of claim 5 wherein said sulfur-resistant methanation catalyst comprises in weight percent 1.5 to 15 of CoO, 6 to 60 of $MoO_3$, and 25–92.5 of $Al_2O_3$.

7. The process of claim 1 where in said sulfur-resistant methanation catalyst the amount of said first and second elements taken together are in the range of about 5 to 60 weight percent and the remainder is a substrate material selected from the group consisting of alumina, silica, silica stabilized alumina, rare earth metal ions exchanged zeolite, and diatomaceous earth.

8. The process of claim 5 where in said sulfur-resistant methanation catalyst the amount of Co plus Mo is in the range of about 5 to 60 weight percent and the remainder is alumina.

9. The process of claim 5 wherein said alumina is stabilized with up to 5 weight percent (basis alumina) of silica.

10. The process of claim 1 wherein the sulfur-resistant methanation catalyst in step (4) comprises about 0.9 to 3 atoms of tungsten per atom of an element selected from the group consisting of Co, Ni, or mixtures thereof.

11. The process of claim 1 wherein the methane-rich gas stream from step (5) has a gross heating value in the range of about 350 to 950 BTU per SCF and comprises in mole % $CH_4$ 10 to 95, CO 0 to 50, $H_2$ 0 to 50, and Ar+$N_2$ 0 to 0.4.

12. The process of claim 1 provided with the additional steps of
   6. introducing supplemental $H_2O$ into the process gas stream from step (5) to provide a mole ratio of CO/$H_2O$ in the range of about 0.3 to 1.0;
   7. reacting the gaseous mixture from (6) in a catalytic water-gas shift reactor to provide an effluent gas stream having a mole ratio $H_2$/(CO+$CO_2$) in the range of about 1 to 4;
   8. introducing the process gas stream from (7) into a conventional catalytic methanation zone and reacting substantially all of the $H_2$ and carbon oxides contained therein over a conventional methanation catalyst at a temperature in the range of about 390° to 1000°F. and a pressure in the range of about 1 to 250 atmospheres; and
   9. cooling the effluent gas stream from (8) to condense out $H_2O$, and removing $CO_2$ to produce a product gas comprising about 98 or more mole % $CH_4$ and having a gross heating value in the range of about 800 to 1000 BTU per SCF.

13. The process of claim 1 wherein the methanation zone in step (4) comprises a fluidized bed methanator, the sulfur resistant catalyst has a particle size in the range of about 20 to 1000 microns, the pressure is in the range of about 1 to 50 atmospheres, and the contact time is in the range of about 0.5 to 10 seconds.

14. The process of claim 1 wherein said temperature moderating gas is $CO_2$, and said $CO_2$ is obtained at least in part from the gas separation zone in step (5).

15. The process of claim 1 wherein the pressure in steps (1) through (5) is substantially the same as the pressure in the gas generator in step (1) less ordinary line drop.

16. The process of claim 1 wherein at least a portion of the sulfur-containing hydrocarbonaceous fuel feed in step (1) comprises a pumpable slurry of a solid hydrocarbonaceous fuel selected from the group consisting of the particulate carbon separated in step (3), coal, and petroleum coke in admixture with a liquid selected from the group consisting of liquid hydrocarbon fuel and water.

17. The process of claim 1 wherein said sulfur-containing hydrocarbonaceous fuel feed in step (1) is a liquid hydrocarbon selected from the group consisting of petroleum distillate, naphtha, gas oil, residual fuel, asphalt, reduced crude, whole crude, coal tar, coal oil, shale oil, tar sand oil, and mixtures thereof.

18. The process of claim 1 wherein 0.5–50 volumes of the methane-rich gas stream from step (5) per volume of process gas stream from step (3) are cooled and recycled through the methanation zone in step (4).

19. The process of claim 1 wherein the process gas stream introduced into the catalytic methanation zone in step (4) contains in ppm $H_2S$ nil to 2.0, and COS nil to 0.1.

20. A process for producing a methane-rich gas from a sulfur-containing hydrocarbonaceous fuel comprising the steps of
   1. reacting a sulfur-containing hydrocarbonaceous fuel feed containing 1 to 7 wt. % S by partial oxidation with substantially pure oxygen comprising 95 mole % $O_2$ or more and $H_2O$ at an autogenous temperature in the range of about 1700° to 3100°F. and a pressure in the range of about 1 to 250 atmospheres in the reaction zone of a free-flow unpacked noncatalytic synthesis gas generator, wherein the weight ratio of $H_2O$/hydrocarbonaceous fuel is in the range of about 0.20 to 5 and the mole ratio of oxygen in the free-oxygen containing gas to carbon in the hydrocarbonaceous fuel is in the range of about 0.80 to 1.0 and the stream of effluent gas leaving the synthesis gas generator comprises $H_2$ and CO having a mole ratio $H_2$/CO in the range of about 1.0 to 2.5, $H_2O$, $CO_2$, $CH_4$, $H_2S$, COS, $N_2$, Ar, and particulate carbon;
   2. cooling the process gas stream from (1) to a temperature in the range of about 300° to 800°F. by indirect heat exchange with water thereby producing steam;
   3. separating particulate carbon and $H_2O$ from the process gas stream from (2);
   4. introducing the process gas stream from (3) without purification of said gas stream directly containing nil to 20,000 ppm of sulfur and at an inlet temperature in the range of about 500° to 1000°F into a methanation zone comprising at least one fixed bed of sulfur-resistant methanation catalyst comprising in wt. % CoO 3 to 4, $MoO_3$ 9.5 to 16 and the remainder alumina, and at a space velocity in the range of about 80 to 10,000 v/v/hr reacting said $H_2$ and CO together at a pressure in the range of about 1 to 250 atmospheres to produce an effluent gas stream at a temperature in the range of about 700 to 1300°F. and comprising $CH_4$, $H_2$, CO and one or more members of the group consisting of $H_2O$, $CO_2$, COS, $H_2S$, Ar, and $N_2$; and
   5. cooling the effluent gas stream from (4) and removing one or more members of said group therefrom in a gas purification zone to produce a methane-rich gas stream comprising 10 to 95 mole % (dry basis) of $CH_4$.

21. The process of claim 20 provided with the additional steps of
   a. introducing supplemental $H_2O$ into the process gas stream from step (5) to provide a mole ratio of CO/$H_2O$ in the range of about 0.3 to 1.0;

b. reacting the gaseous mixture from (a) in a catalytic water-gas shift reactor to provide an effluent gas stream having a mole ratio $H_2/(CO+CO_2)$ in the range of about 1 to 4:

c. introducing the process gas stream from (b) into a conventional catalytic methanation zone and reacting substantially all of the $H_2$ and carbon oxides contained therein over a conventional methanation catalyst at a temperature in the range of about 390° to 1000°F. and a pressure in the range of about 1 to 250 atmospheres; and d. cooling the effluent gas stream from (c) to condense out $H_2O$, and removing $CO_2$ to produce a product gas comprising 70 to 98 or more mole % $CH_4$ and having a gross heating value in the range of 800 to 1000 BTU per SCF.

22. The process of claim 1 where in step (5) $H_2O$, $CO_2$, COS, and $H_2S$ are removed from the effluent gas stream.

23. The process of claim 1 where in the reaction temperature in the methanation zone in step (4) is in the range of about 500° to 800°F.

* * * * *

UNITED STATES PATENT OFFICE
CERTIFICATE OF CORRECTION

Patent No. 3,928,000                   Dated December 23, 1975

Inventor(s) Edward T. Child et al.

It is certified that error appears in the above-identified patent and that said Letters Patent are hereby corrected as shown below:

Abstract line 10, "comprising Co" to read -- Mo --

Abstract line 11, "Mo" to read -- comprising Co, --

Column 1, lines 62 and 63, "product" to read -- produce --.

Signed and Sealed this

Fourteenth Day of June 1977

[SEAL]

Attest:

RUTH C. MASON
Attesting Officer

C. MARSHALL DANN
Commissioner of Patents and Trademarks